United States Patent
Wang et al.

(10) Patent No.: US 9,397,556 B2
(45) Date of Patent: Jul. 19, 2016

(54) POWER SUPPLY APPARATUS WITH AUXILIARY BOOST CIRCUIT

(71) Applicant: Chicony Power Technology Co., Ltd., New Taipei (TW)

(72) Inventors: Tzu-Hung Wang, New Taipei (TW); Che-Hao Chang, New Taipei (TW); Zhi-Hong Lu, New Taipei (TW); Chiuan-Shing Wu, New Taipei (TW); Meng-Chi Yang, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 176 days.

(21) Appl. No.: 14/486,244

(22) Filed: Sep. 15, 2014

(65) Prior Publication Data

US 2016/0079880 A1    Mar. 17, 2016

(51) Int. Cl.
*H02M 5/42*     (2006.01)
*H02M 1/42*     (2007.01)
*H02M 3/156*    (2006.01)

(52) U.S. Cl.
CPC ............ *H02M 1/4225* (2013.01); *H02M 3/156* (2013.01)

(58) Field of Classification Search
CPC ........ H02M 1/42; H02M 7/04; H02M 1/4225
USPC .......................................................... 363/84
See application file for complete search history.

(56) References Cited

U.S. PATENT DOCUMENTS

| | | | | |
|---|---|---|---|---|
| 6,608,452 B1* | 8/2003 | Holmes | ................. | H05B 41/28 315/224 |
| 2007/0194759 A1* | 8/2007 | Shimizu | ................. | H02J 7/0016 320/166 |
| 2012/0001599 A1* | 1/2012 | Tanaka | ................. | H02M 1/10 323/205 |
| 2013/0264879 A1* | 10/2013 | Shih | ................. | H02J 9/005 307/66 |
| 2015/0092458 A1* | 4/2015 | Levy | ................. | H02M 3/33507 363/21.12 |

* cited by examiner

*Primary Examiner* — Jessica Han
*Assistant Examiner* — Lorena Bruner
(74) *Attorney, Agent, or Firm* — Muncy, Geissler, Olds & Lowe, P.C.

(57) ABSTRACT

A power supply apparatus includes a rectification circuit, a power factor correction circuit, an auxiliary boost circuit and a direct current to direct current conversion circuit. The auxiliary boost circuit includes an input contact, an output contact, a voltage detection unit, a control unit, a boost unit and a boost bypass unit. When a voltage value of a power factor correction power is not greater than a predetermined voltage value, the control unit is configured to turn off the boost bypass unit and turn on the boost unit, so that the boost unit boosts the power factor correction power and then the power factor correction power is sent to the direct current to direct current conversion circuit through the boost unit and the output contact.

10 Claims, 7 Drawing Sheets

POWER SUPPLY APPARATUS WITH AUXILIARY BOOST CIRCUIT

BACKGROUND OF THE INVENTION

1. Field of the Invention

The present invention relates to a power supply apparatus, and especially relates to a power supply apparatus with an auxiliary boost circuit.

2. Description of the Related Art

FIG. 1 shows a block diagram of a related art power supply apparatus. A related art power supply apparatus 40 is applied to an alternating current power supply apparatus 20 and a load apparatus 30. The related art power supply apparatus 40 includes a rectification circuit 102, a power factor correction circuit 104 and a direct current to direct current conversion circuit 108.

The rectification circuit 102 is electrically connected to the alternating current power supply apparatus 20. The power factor correction circuit 104 is electrically connected to the rectification circuit 102. The direct current to direct current conversion circuit 108 is electrically connected to the power factor correction circuit 104 and the load apparatus 30.

The alternating current power supply apparatus 20 sends an alternating current power 22 to the rectification circuit 102. The rectification circuit 102 rectifies the alternating current power 22 to obtain a direct current power 24. The rectification circuit 102 sends the direct current power 24 to the power factor correction circuit 104. The power factor correction circuit 104 processes the direct current power 24 to obtain a power factor correction power 26.

The power factor correction circuit 104 sends the power factor correction power 26 to the direct current to direct current conversion circuit 108. The direct current to direct current conversion circuit 108 converts the power factor correction power 26 into a driving power 29. The direct current to direct current conversion circuit 108 sends the driving power 29 to the load apparatus 30.

FIG. 2 shows a voltage waveform diagram of an embodiment of the power factor correction power of the related art power supply apparatus. Please refer to FIG. 1 as well. The power factor correction power 26 is a 400 volts direct current power when the alternating current power supply apparatus 20 supplies the alternating current power 22 normally.

The power factor correction power 26 will not drop to zero immediately when the alternating current power supply apparatus 20 stops supplying the alternating current power 22 (dotted line). The power factor correction power 26 will drop to zero gradually, so that the direct current to direct current conversion circuit 108 and the load apparatus 30 are protected. A hold up time (for example, 10 milliseconds) is defined as a time interval between the alternating current power supply apparatus 20 stopping supplying the alternating current power 22 and the power factor correction power 26 becoming zero.

The direct current to direct current conversion circuit 108 is still possibly damaged by the variation of the power factor correction power 26 although the power factor correction power 26 drops to zero gradually when the alternating current power supply apparatus 20 stops supplying the alternating current power 22. Therefore, the components of the direct current to direct current conversion circuit 108 must have high specifications (for example, high voltage resistance). The cost of the direct current to direct current conversion circuit 108 is increased.

SUMMARY OF THE INVENTION

In order to solve the above-mentioned problems, an object of the present invention is to provide a power supply apparatus with an auxiliary boost circuit.

In order to achieve the object of the present invention mentioned above, the power supply apparatus is applied to an alternating current power supply apparatus and a load apparatus. The power supply apparatus comprises a rectification circuit, a power factor correction circuit, the auxiliary boost circuit and a direct current to direct current conversion circuit. The rectification circuit is electrically connected to the alternating current power supply apparatus. The power factor correction circuit is electrically connected to the rectification circuit. The auxiliary boost circuit is electrically connected to the power factor correction circuit. The direct current to direct current conversion circuit is electrically connected to the auxiliary boost circuit and the load apparatus. The auxiliary boost circuit comprises an input contact, an output contact, a voltage detection unit, a control unit, a boost unit and a boost bypass unit. The input contact is electrically connected to the power factor correction circuit. The output contact is electrically connected to the direct current to direct current conversion circuit. The voltage detection unit is electrically connected to the input contact. The control unit is electrically connected to the voltage detection unit and the power factor correction circuit. The boost unit is electrically connected to the input contact, the output contact and the control unit. The boost bypass unit is electrically connected to the input contact, the output contact, the control unit and the direct current to direct current conversion circuit. The alternating current power supply apparatus sends an alternating current power to the rectification circuit. The rectification circuit rectifies the alternating current power to obtain a direct current power. The rectification circuit sends the direct current power to the power factor correction circuit. The power factor correction circuit processes the direct current power to obtain a power factor correction power. The power factor correction circuit sends the power factor correction power to the input contact. The voltage detection unit detects the power factor correction power and then informs the control unit the power factor correction power. When a voltage value of the power factor correction power is greater than a predetermined voltage value, the control unit is configured to turn on the boost bypass unit and turn off the boost unit, so that the power factor correction power is sent to the direct current to direct current conversion circuit through the boost bypass unit and the output contact. When the voltage value of the power factor correction power is not greater than the predetermined voltage value, the control unit is configured to turn off the boost bypass unit and turn on the boost unit, so that the boost unit boosts the power factor correction power and then the power factor correction power is sent to the direct current to direct current conversion circuit through the boost unit and the output contact.

The advantage of the present invention is to reduce the variation of the input voltage of the direct current to direct current conversion circuit when the alternating current power supply apparatus stops supplying the alternating current power. The design of the direct current to direct current conversion circuit is optimized and the cost of the direct current to direct current conversion circuit is reduced.

DETAILED DESCRIPTION OF THE INVENTION

Figure 1:
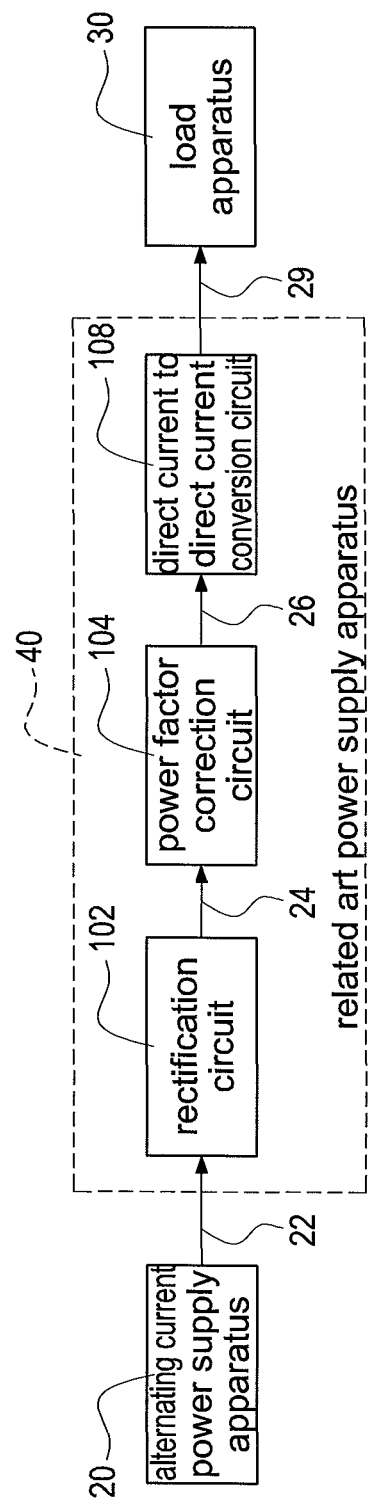
FIG. 1 shows a block diagram of a related art power supply apparatus.
Figure 2:
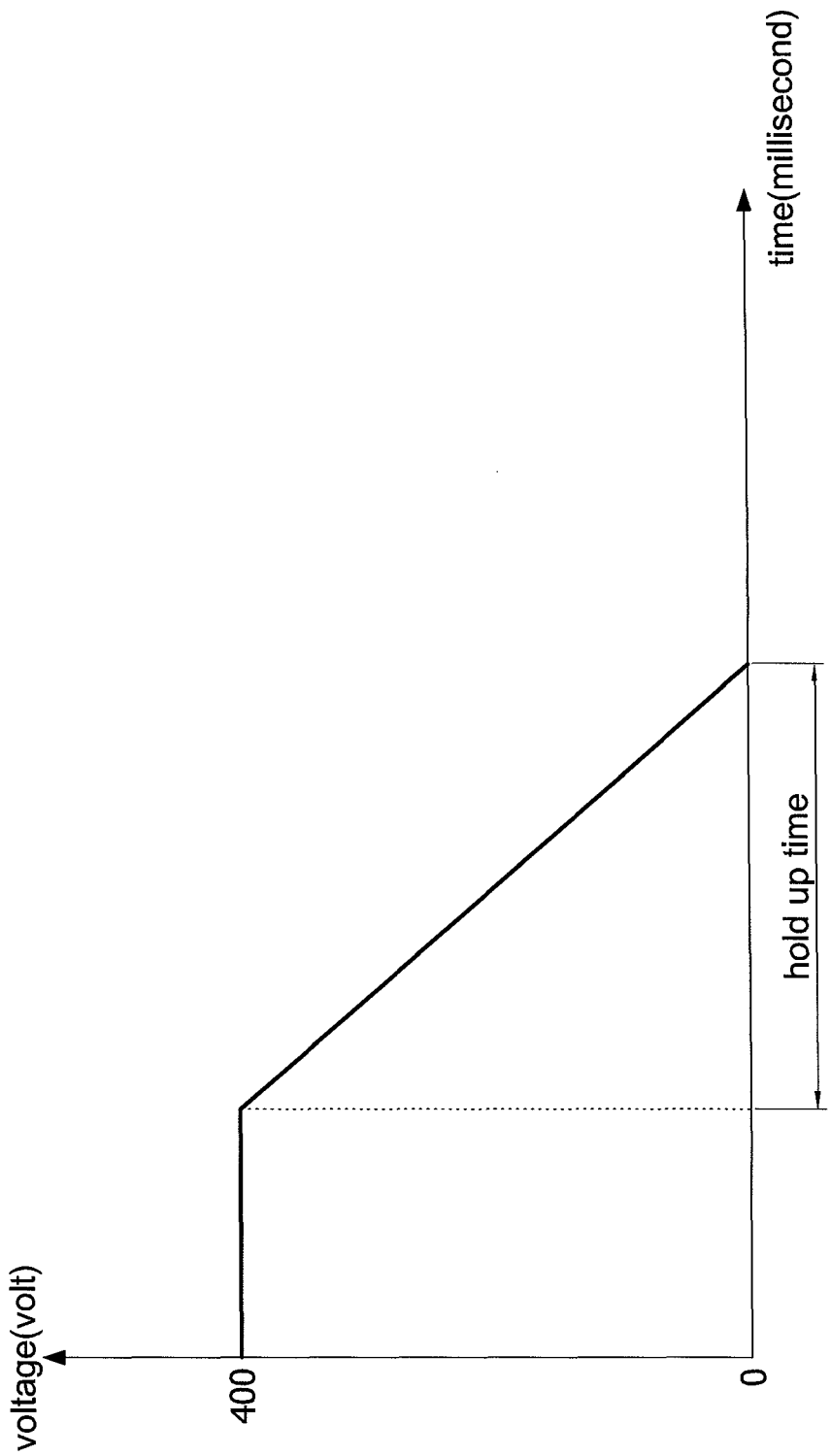
FIG. 2 shows a voltage waveform diagram of an embodiment of the power factor correction power of the related art power supply apparatus.
Figure 3:
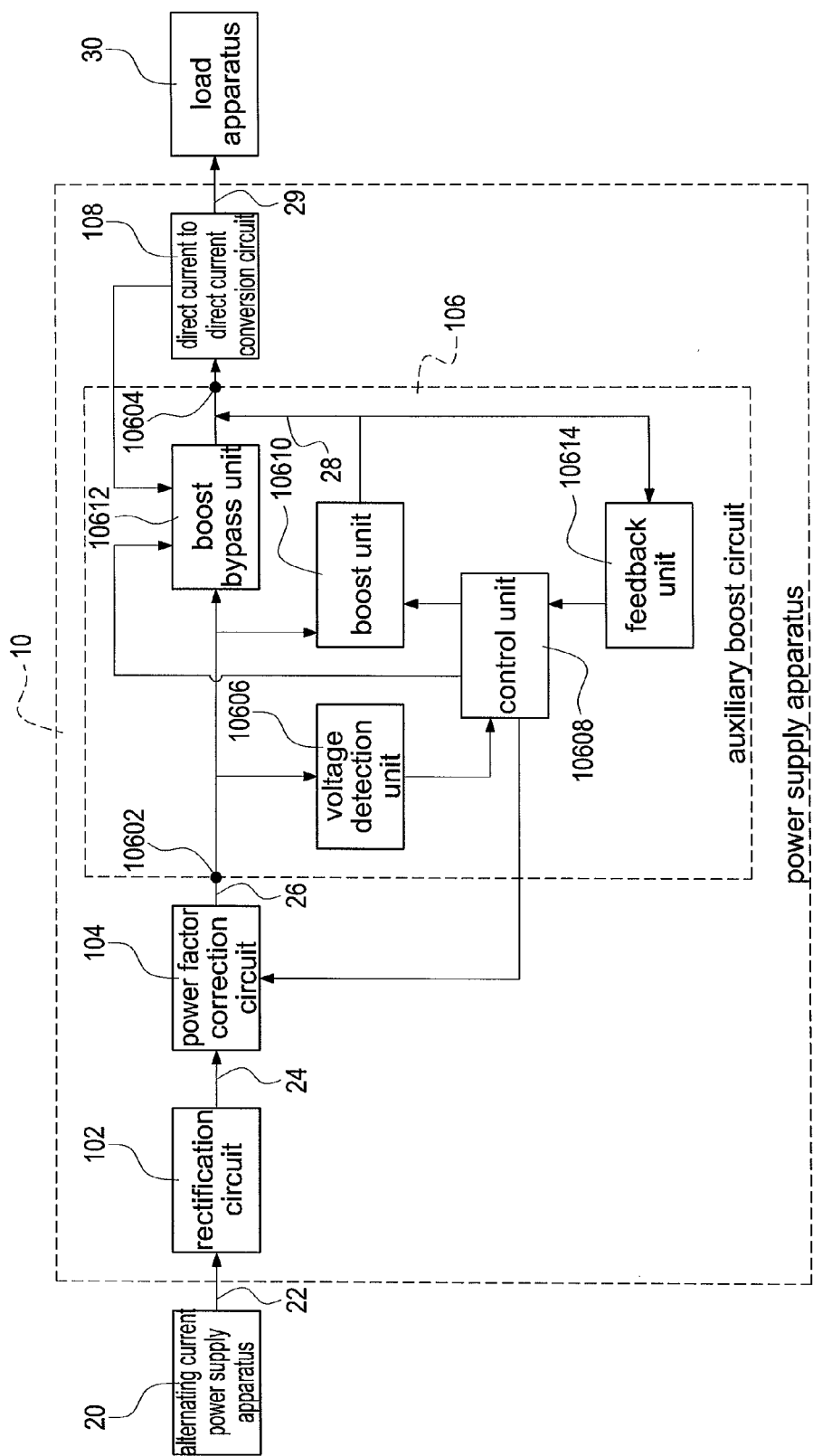
FIG. 3 shows a block diagram of the power supply apparatus of the present invention.

FIG. 3 shows a block diagram of the power supply apparatus of the present invention. A power supply apparatus 10 is applied to an alternating current power supply apparatus 20 and a load apparatus 30.

The power supply apparatus 10 comprises a rectification circuit 102, a power factor correction circuit 104, an auxiliary boost circuit 106 and a direct current to direct current conversion circuit 108.

The auxiliary boost circuit 106 comprises an input contact 10602, an output contact 10604, a voltage detection unit 10606, a control unit 10608, a boost unit 10610, a boost bypass unit 10612 and a feedback unit 10614.

The rectification circuit 102 is electrically connected to the alternating current power supply apparatus 20. The power factor correction circuit 104 is electrically connected to the rectification circuit 102. The auxiliary boost circuit 106 is electrically connected to the power factor correction circuit 104. The direct current to direct current conversion circuit 108 is electrically connected to the auxiliary boost circuit 106 and the load apparatus 30.

The input contact 10602 is electrically connected to the power factor correction circuit 104. The output contact 10604 is electrically connected to the direct current to direct current conversion circuit 108. The voltage detection unit 10606 is electrically connected to the input contact 10602. The control unit 10608 is electrically connected to the voltage detection unit 10606 and the power factor correction circuit 104. The boost unit 10610 is electrically connected to the input contact 10602, the output contact 10604 and the control unit 10608. The boost bypass unit 10612 is electrically connected to the input contact 10602, the output contact 10604, the control unit 10608 and the direct current to direct current conversion circuit 108. The feedback unit 10614 is electrically connected to the control unit 10608 and the output contact 10604.

The alternating current power supply apparatus 20 sends an alternating current power 22 to the rectification circuit 102. The rectification circuit 102 rectifies the alternating current power 22 to obtain a direct current power 24. The rectification circuit 102 sends the direct current power 24 to the power factor correction circuit 104. The power factor correction circuit 104 processes the direct current power 24 to obtain a power factor correction power 26. The power factor correction circuit 104 sends the power factor correction power 26 to the input contact 10602.

The voltage detection unit 10606 detects the power factor correction power 26 and then informs the control unit 10608 the power factor correction power 26.

Figure 4:
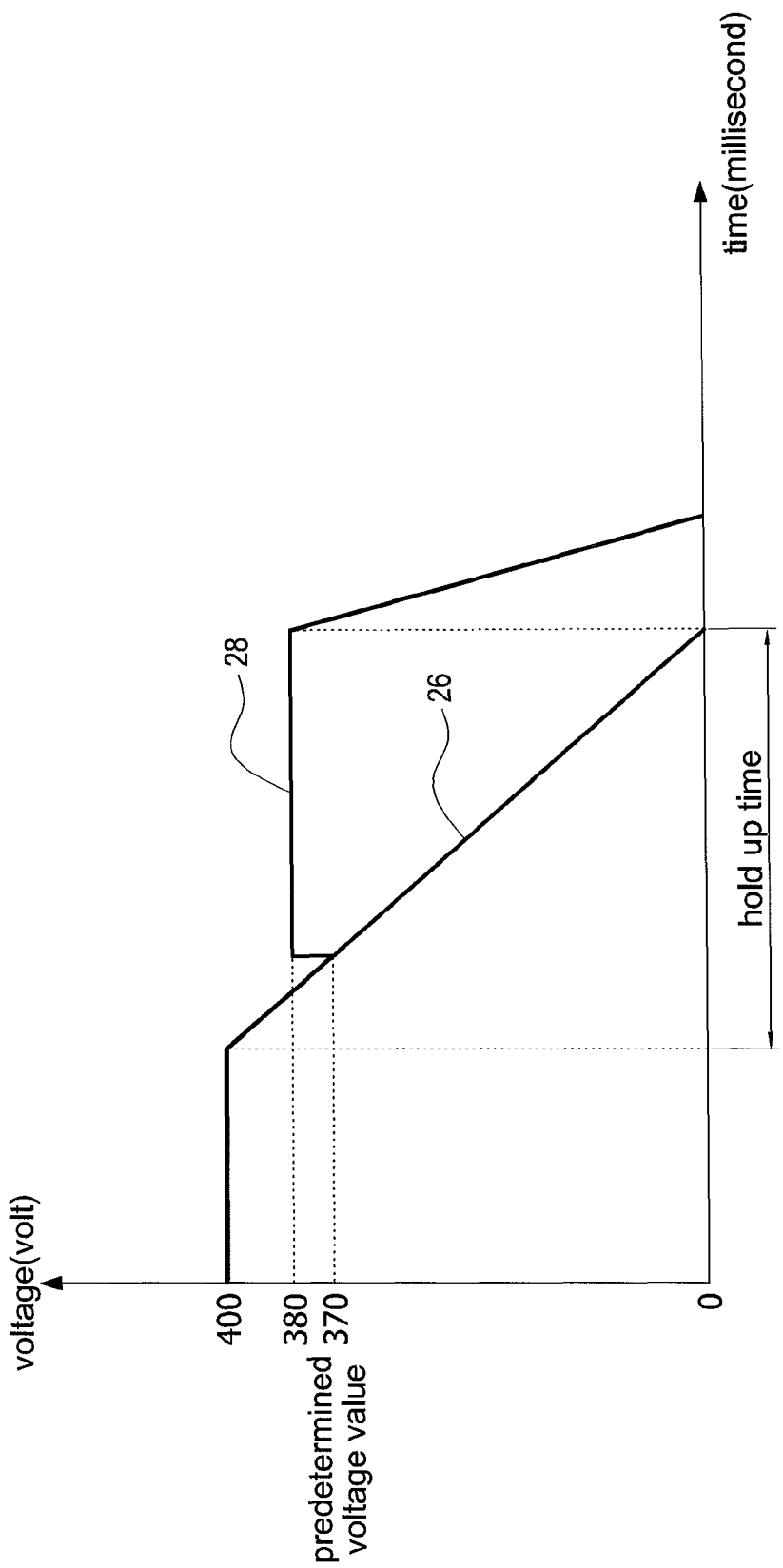
FIG. 4 shows a voltage waveform diagram of an embodiment of the power factor correction power and the boost power of the power supply apparatus of the present invention.

FIG. 4 shows a voltage waveform diagram of an embodiment of the power factor correction power and the boost power of the power supply apparatus of the present invention. Please refer to FIG. 3 as well. The power factor correction power 26 is a 400 volts direct current power when the alternating current power supply apparatus 20 supplies the alternating current power 22 normally.

When a voltage value of the power factor correction power 26 is greater than a predetermined voltage value (for example, 370 volts), the control unit 10608 is configured to turn on the boost bypass unit 10612 and turn off the boost unit 10610, so that the power factor correction power 26 is sent to the direct current to direct current conversion circuit 108 through the boost bypass unit 10612 and the output contact 10604.

When the voltage value of the power factor correction power 26 is not greater than the predetermined voltage value, the control unit 10608 is configured to turn off the boost bypass unit 10612 and turn on the boost unit 10610, so that the boost unit 10610 boosts the power factor correction power 26 and then the power factor correction power 26 is sent to the direct current to direct current conversion circuit 108 through the boost unit 10610 and the output contact 10604.

In an embodiment, first, the control unit 10608 is configured to turn off the boost bypass unit 10612. Second, the control unit 10608 is configured to turn on the boost unit 10610. Therefore, the power supply apparatus 10 is protected more efficiently.

In another word, after the boost unit 10610 boosts the power factor correction power 26, the boost unit 10610 boosts the power factor correction power 26 to obtain a boost power 28 (for example, 380 volts) and maintains the boost power 28 until the power factor correction power 26 is zero. The boost power 28 is decreased to zero with a slope after the power factor correction power 26 is zero. The boost unit 10610 sends the boost power 28 to the direct current to direct current conversion circuit 108.

The direct current to direct current conversion circuit 108 converts the power factor correction power 26 (the boost power 28) into a driving power 29. The direct current to direct current conversion circuit 108 sends the driving power 29 to the load apparatus 30.

Figure 5:
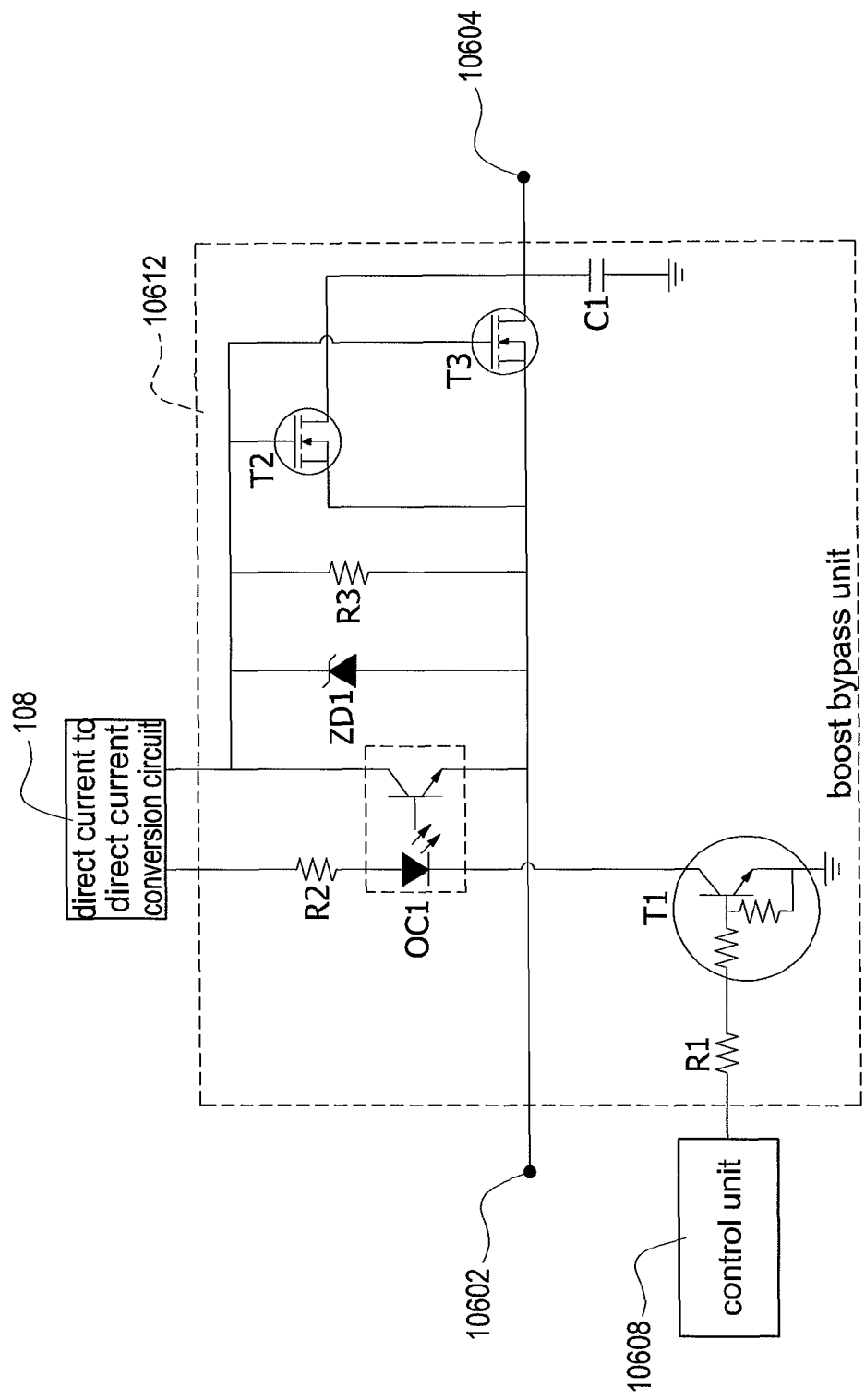
FIG. 5 shows a circuit diagram of the boost bypass unit of the present invention.

FIG. 5 shows a circuit diagram of the boost bypass unit of the present invention. The boost bypass unit 10612 comprises a first resistor R1, a first transistor T1, an optical coupler OC1, a second resistor R2, a Zener diode ZD1, a third resistor R3, a second transistor T2, a third transistor T3 and a first capacitor C1.

The first resistor R1 is electrically connected to the control unit 10608. The first transistor T1 is electrically connected to the first resistor R1. The optical coupler OC1 is electrically connected to the first transistor T1, the direct current to direct current conversion circuit 108 and the input contact 10602. The second resistor R2 is electrically connected to the optical coupler OC1 and the direct current to direct current conversion circuit 108. The Zener diode ZD1 is electrically connected to the direct current to direct current conversion circuit 108 and the input contact 10602.

The third resistor R3 is electrically connected to the direct current to direct current conversion circuit 108 and the input contact 10602. The second transistor T2 is electrically connected to the direct current to direct current conversion circuit 108, the input contact 10602 and the output contact 10604. The third transistor T3 is electrically connected to the direct current to direct current conversion circuit 108, the input contact 10602 and the output contact 10604. The first capacitor C1 is electrically connected to the output contact 10604.

The direct current to direct current conversion circuit 108 supplies a driving voltage to the boost bypass unit 10612.

Figure 6:
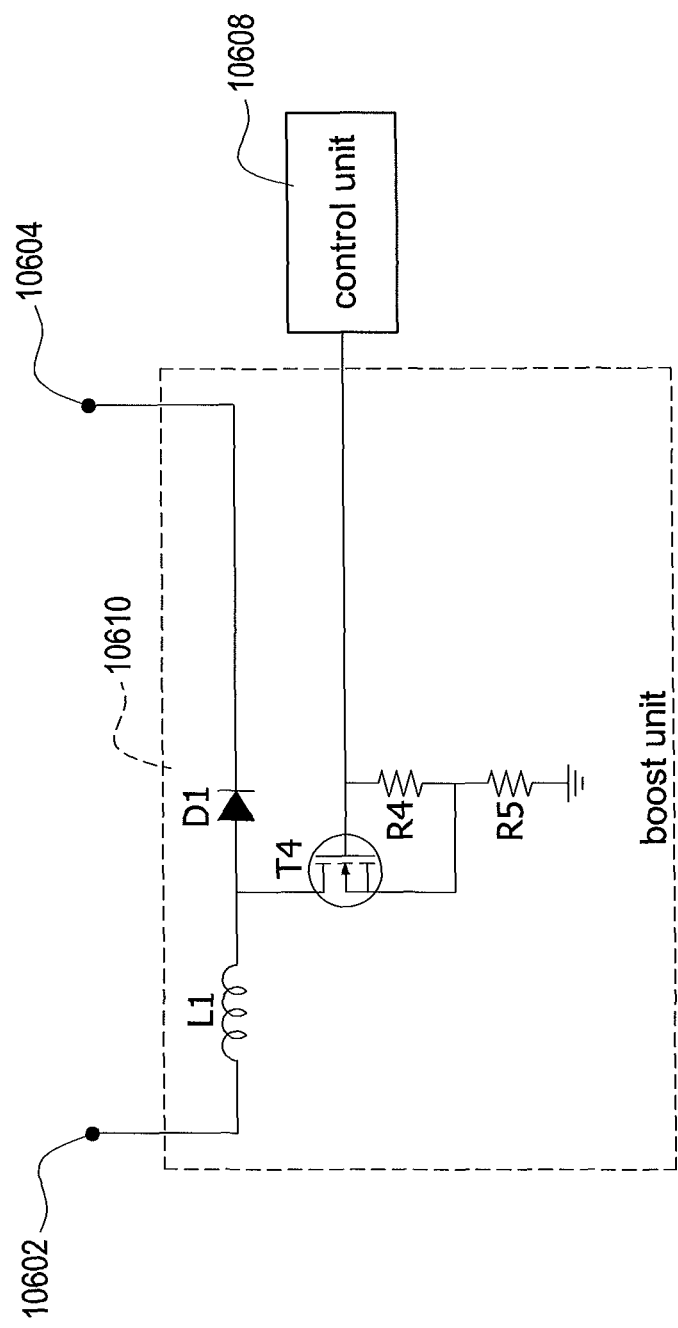
FIG. 6 shows a circuit diagram of the boost unit of the present invention.

FIG. 6 shows a circuit diagram of the boost unit of the present invention. The boost unit 10610 comprises a fourth transistor T4, a first inductor L1, a first diode D1, a fourth resistor R4 and a fifth resistor R5.

The fourth transistor T4 is electrically connected to the control unit 10608. The first inductor L1 is electrically connected to the fourth transistor T4 and the input contact 10602. The first diode D1 is electrically connected to the fourth transistor T4, the first inductor L1 and the output contact 10604. The fourth resistor R4 is electrically connected to the fourth transistor T4 and the control unit 10608. The fifth resistor R5 is electrically connected to the fourth transistor T4 and the fourth resistor R4.

Figure 7:
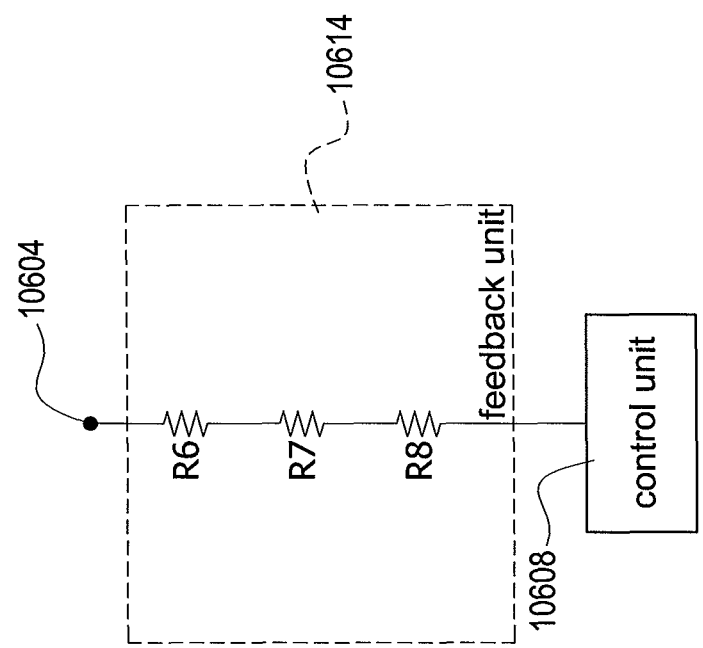
FIG. 7 shows a circuit diagram of the feedback unit of the present invention.

FIG. 7 shows a circuit diagram of the feedback unit of the present invention. The feedback unit 10614 comprises a sixth resistor R6, a seventh resistor R7 and an eighth resistor R8.

The sixth resistor R6 is electrically connected to the output contact 10604. The seventh resistor R7 is electrically connected to the sixth resistor R6. The eighth resistor R8 is electrically connected to the seventh resistor R7 and the control unit 10608.

Figure 8:
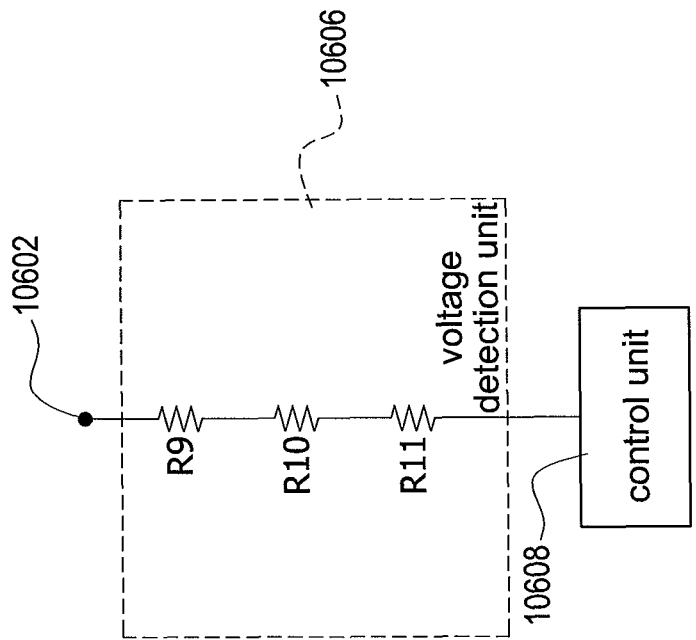
FIG. 8 shows a circuit diagram of the voltage detection unit of the present invention.

FIG. 8 shows a circuit diagram of the voltage detection unit of the present invention. The voltage detection unit 10606 comprises a ninth resistor R9, a tenth resistor R10 and an eleventh resistor R11.

The ninth resistor R9 is electrically connected to the input contact 10602. The tenth resistor R10 is electrically connected to the ninth resistor R9. The eleventh resistor R11 is electrically connected to the tenth resistor R10 and the control unit 10608.

The advantage of the present invention is to reduce the variation of the input voltage of the direct current to direct current conversion circuit 108 when the alternating current power supply apparatus 20 stops supplying the alternating current power 22. The design (for examples, X'mer, SR_MosFet and so on) of the direct current to direct current conversion circuit 108 is optimized and the cost of the direct current to direct current conversion circuit 108 is reduced (namely, the components of the direct current to direct current conversion circuit 108 do not need to have high specifications).

Moreover, the optical coupler OC1 can increase electrical isolation effect to protect the second transistor T2 and the third transistor T3. The present invention can prolong the hold up time because there is no duty limited problem. The PWM duty of the direct current to direct current conversion circuit 108 is designed for 370400 volts. This is the optimal design for X'mer.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power supply apparatus applied to an alternating current power supply apparatus and a load apparatus, the power supply apparatus comprising:
    a rectification circuit electrically connected to the alternating current power supply apparatus;
    a power factor correction circuit electrically connected to the rectification circuit;
    an auxiliary boost circuit electrically connected to the power factor correction circuit; and
    a direct current to direct current conversion circuit electrically connected to the auxiliary boost circuit and the load apparatus,
    wherein the auxiliary boost circuit comprises:
    an input contact electrically connected to the power factor correction circuit;
    an output contact electrically connected to the direct current to direct current conversion circuit;
    a voltage detection unit electrically connected to the input contact;
    a control unit electrically connected to the voltage detection unit and the power factor correction circuit;
    a boost unit electrically connected to the input contact, the output contact and the control unit; and
    a boost bypass unit electrically connected to the input contact, the output contact, the control unit and the direct current to direct current conversion circuit,
    wherein the alternating current power supply apparatus sends an alternating current power to the rectification circuit; the rectification circuit rectifies the alternating current power to obtain a direct current power; the rectification circuit sends the direct current power to the power factor correction circuit; the power factor correction circuit processes the direct current power to obtain a power factor correction power; the power factor correction circuit sends the power factor correction power to the input contact;
    wherein the voltage detection unit detects the power factor correction power and then informs the control unit the power factor correction power;
    wherein when a voltage value of the power factor correction power is greater than a predetermined voltage value, the control unit is configured to turn on the boost bypass unit and turn off the boost unit, so that the power factor correction power is sent to the direct current to direct current conversion circuit through the boost bypass unit and the output contact;
    wherein when the voltage value of the power factor correction power is not greater than the predetermined voltage value, the control unit is configured to turn off the boost bypass unit and turn on the boost unit, so that the boost unit boosts the power factor correction power and then the power factor correction power is sent to the direct current to direct current conversion circuit through the boost unit and the output contact.

2. The power supply apparatus in claim 1, further comprising:
    a feedback unit electrically connected to the control unit and the output contact.

3. The power supply apparatus in claim 2, wherein the boost bypass unit comprises:
    a first resistor electrically connected to the control unit;
    a first transistor electrically connected to the first resistor;
    an optical coupler electrically connected to the first transistor, the direct current to direct current conversion circuit and the input contact; and
    a second resistor electrically connected to the optical coupler and the direct current to direct current conversion circuit.

4. The power supply apparatus in claim 3, wherein the boost bypass unit further comprises:
    a zener diode electrically connected to the direct current to direct current conversion circuit and the input contact; and a third resistor electrically connected to the direct current to direct current conversion circuit and the input contact.

5. The power supply apparatus in claim 4, wherein the boost bypass unit further comprises:
a second transistor electrically connected to the direct current to direct current conversion circuit, the input contact and the output contact;
a third transistor electrically connected to the direct current to direct current conversion circuit, the input contact and the output contact; and
a first capacitor electrically connected to the output contact.

6. The power supply apparatus in claim 5, wherein the boost unit comprises:
a fourth transistor electrically connected to the control unit;
a first inductor electrically connected to the fourth transistor and the input contact; and
a first diode electrically connected to the fourth transistor, the first inductor and the output contact.

7. The power supply apparatus in claim 6, wherein the boost unit further comprises:
a fourth resistor electrically connected to the fourth transistor and the control unit; and
a fifth resistor electrically connected to the fourth transistor and the fourth resistor.

8. The power supply apparatus in claim 7, wherein the feedback unit comprises:
a sixth resistor electrically connected to the output contact.

9. The power supply apparatus in claim 8, wherein the feedback unit further comprises:
a seventh resistor electrically connected to the sixth resistor; and
an eighth resistor electrically connected to the seventh resistor and the control unit.

10. The power supply apparatus in claim 9, wherein the voltage detection unit comprises:
a ninth resistor electrically connected to the input contact;
a tenth resistor electrically connected to the ninth resistor; and
an eleventh resistor electrically connected to the tenth resistor and the control unit.

* * * * *